(12) United States Patent
Sahu et al.

(10) Patent No.: US 8,903,367 B2
(45) Date of Patent: Dec. 2, 2014

(54) METHODS AND APPARATUS FOR ENABLING BACKWARD COMPATIBILITY IN OPEN MARKET HANDSETS

(75) Inventors: Debesh Kumar Sahu, Hyderabad (IN); Sivaramakrishna Veerepalli, San Diego, CA (US); Nakul Duggal, San Diego, CA (US); Zhimin Du, Beijing (CN)

(73) Assignee: Qualcomm Incorporated, San Diego, CA (US)

( * ) Notice: Subject to any disclaimer, the term of this patent is extended or adjusted under 35 U.S.C. 154(b) by 247 days.

(21) Appl. No.: 13/035,543

(22) Filed: Feb. 25, 2011

(65) Prior Publication Data

US 2011/0287752 A1 Nov. 24, 2011

Related U.S. Application Data

(60) Provisional application No. 61/346,626, filed on May 20, 2010.

(51) Int. Cl.
*H04L 29/06* (2006.01)

(52) U.S. Cl.
CPC ................................. *H04L 63/20* (2013.01)
USPC ............................ 455/418; 455/410; 455/411

(58) Field of Classification Search
USPC ......................................... 455/418, 410, 411
See application file for complete search history.

(56) References Cited

U.S. PATENT DOCUMENTS

| 5,884,168 | A | 3/1999 | Kolev et al. |
|---|---|---|---|
| 6,606,491 | B1 | 8/2003 | Peck |
| 7,328,016 | B2 | 2/2008 | Buckley |
| 7,649,995 | B2 | 1/2010 | Liu et al. |
| 2006/0099991 | A1* | 5/2006 | Bajikar et al. ............... 455/558 |
| 2006/0135125 | A1* | 6/2006 | Laitinen ....................... 455/411 |
| 2007/0187493 | A1* | 8/2007 | Hong et al. .................. 235/382 |
| 2008/0207166 | A1 | 8/2008 | Aerrabotu et al. |
| 2009/0037729 | A1* | 2/2009 | Smith et al. .................. 713/158 |
| 2009/0172809 | A1 | 7/2009 | Yuan et al. |
| 2011/0124335 | A1* | 5/2011 | Martin et al. ................. 455/434 |

FOREIGN PATENT DOCUMENTS

| CN | 1335023 | A | 2/2002 |
|---|---|---|---|
| EP | 1657617 | A2 | 5/2006 |
| JP | 05014973 | | 1/1993 |
| JP | H09238380 | A | 9/1997 |
| JP | 2006121526 | A | 5/2006 |
| JP | 2007221786 | A | 8/2007 |
| WO | WO0031992 | A1 | 6/2000 |
| WO | 2008128874 | A1 | 10/2008 |

OTHER PUBLICATIONS

Open Market Handset (OMH) R-UIM Specification, Jan. 2008, CDG Document 166, pp. 1-54.*
International Search Report and Written Opinion—PCT/US2011/037465—ISA/EPO—Jul. 29, 2011.

* cited by examiner

*Primary Examiner* — Justin Lee
(74) *Attorney, Agent, or Firm* — Abdollah Katbab

(57) ABSTRACT

A method and apparatus for enabling backward compatibility in open market handsets (OMH) is provided. The method may include determining a type of an identity module based on one or more internal parameters of the identity module, and obtaining one or more credentials based at least in part on the determined the type identity module.

38 Claims, 7 Drawing Sheets

METHODS AND APPARATUS FOR ENABLING BACKWARD COMPATIBILITY IN OPEN MARKET HANDSETS

CROSS-REFERENCE TO RELATED APPLICATION(S)

The present application for patent claims priority to Provisional Application No. 61/346,626, entitled "METHODS AND APPARATUS TO MAKE OPEN MARKET HANDSETS BACKWARD COMPATIBLE WITH OLD RUIM CARDS," filed May 20, 2010, the contents of which are expressly incorporated by reference herein.

BACKGROUND

1. Field

The disclosed aspects relate generally to communications between devices and specifically to methods and systems for enabling backward compatibility in open market handsets (OMH).

2. Background

Advances in technology have resulted in smaller and more powerful personal computing devices. For example, there currently exist a variety of portable personal computing devices, including wireless computing devices, such as portable wireless telephones, personal digital assistants (PDAs) and paging devices that are each small, lightweight, and can be easily carried by users. More specifically, the portable wireless telephones, for example, further include cellular telephones that communicate voice and data packets over wireless networks. Further, many such cellular telephones are being manufactured with relatively large increases in computing capabilities, and as such, are becoming tantamount to small personal computers and hand-held PDAs.

Still further, devices may be configured as OMHs. Currently, the OMH initiative is strategic effort aimed at enabling CDMA ecosystem with an open market handset. 3GPP2 has two approved standards C.S0023 Rev D version 1.0 dated Jun. 19, 2009 (Removable User Identity Module for Spread Spectrum Systems) and C.S0065 Rev B version 1.0 dated Jan. 25, 2010 "cdma2000 Application on UICC for Spread Spectrum Systems". According to the standards, all CDMA ecosystem variables and features may be represented by Elementary Files in OMH/CDMA SIM (CSIM) cards. Each Elementary File has its own standardized structure and occupies certain amount of card memory. Further, C.S0023 compliant RUIM cards may have a master EF file (EF-CST: CDMA Service Table), which may indicate supportability of different services by a removable user identity module (RUIM) card. Still further, the OMH initiative has introduced a new revision (i.e. Rev D) of C.S0023 specification. However some operators provide services that are still based on C.S0023 Rev 0 and Rev B cards.

Thus, improved apparatus and methods for enabling backward compatibility in OMHs may be desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in relation to enabling backward compatibility in OMHs. According to one aspect, a method for enabling backward compatibility in OMHs is provided. The method can comprise determining a type of an identity module based on one or more internal parameters of the identity module. Further, the method can comprise obtaining one or more provisioning parameters and/or the one or more credentials based at least in part on the determined the type identity module.

Another aspect relates to at least one processor configured to enable backward compatibility in OMHs. The at least one processor includes a first module for determining a type of an identity module based on one or more internal parameters of the identity module. Further, the at least one processor includes a second module for obtaining one or more provisioning parameters and/or the one or more credentials based at least in part on the determined the type identity module.

Another aspect relates to a computer program product comprising a computer-readable medium. The computer-readable medium comprising code executable to determine a type of an identity module based on one or more internal parameters of the identity module. Further, the computer-readable medium comprises code executable to obtain one or more provisioning parameters and/or the one or more credentials based at least in part on the determined the type identity module.

Yet another aspect relates to an apparatus. The apparatus can comprise means for determining a type of an identity module based on one or more internal parameters of the identity module. Further, the apparatus can comprise means for obtaining one or more provisioning parameters and/or the one or more credentials based at least in part on the determined the type identity module.

Another aspect relates to an apparatus. The apparatus can include a compatibility module operable to determining a type of an identity module based on one or more internal parameters of the identity module. Further, the compatibility module may be operable to obtain one or more provisioning parameters and/or the one or more credentials based at least in part on the determined the type identity module.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Generally, a user may attempt to communicate with an access network and/or core network 125 through a communications device 110. Further, communications device 110 may coordinate with compatibility server 130 to enable backward compatibility for modules and/or applications associated with communications device 110. In one aspect, a communications device 110 may include: a wireless communications device (WCD), and/or multiple devices, both wireline and wireless. For example, multiple devices may work in tandem, as a network, etc.

Figure 1:
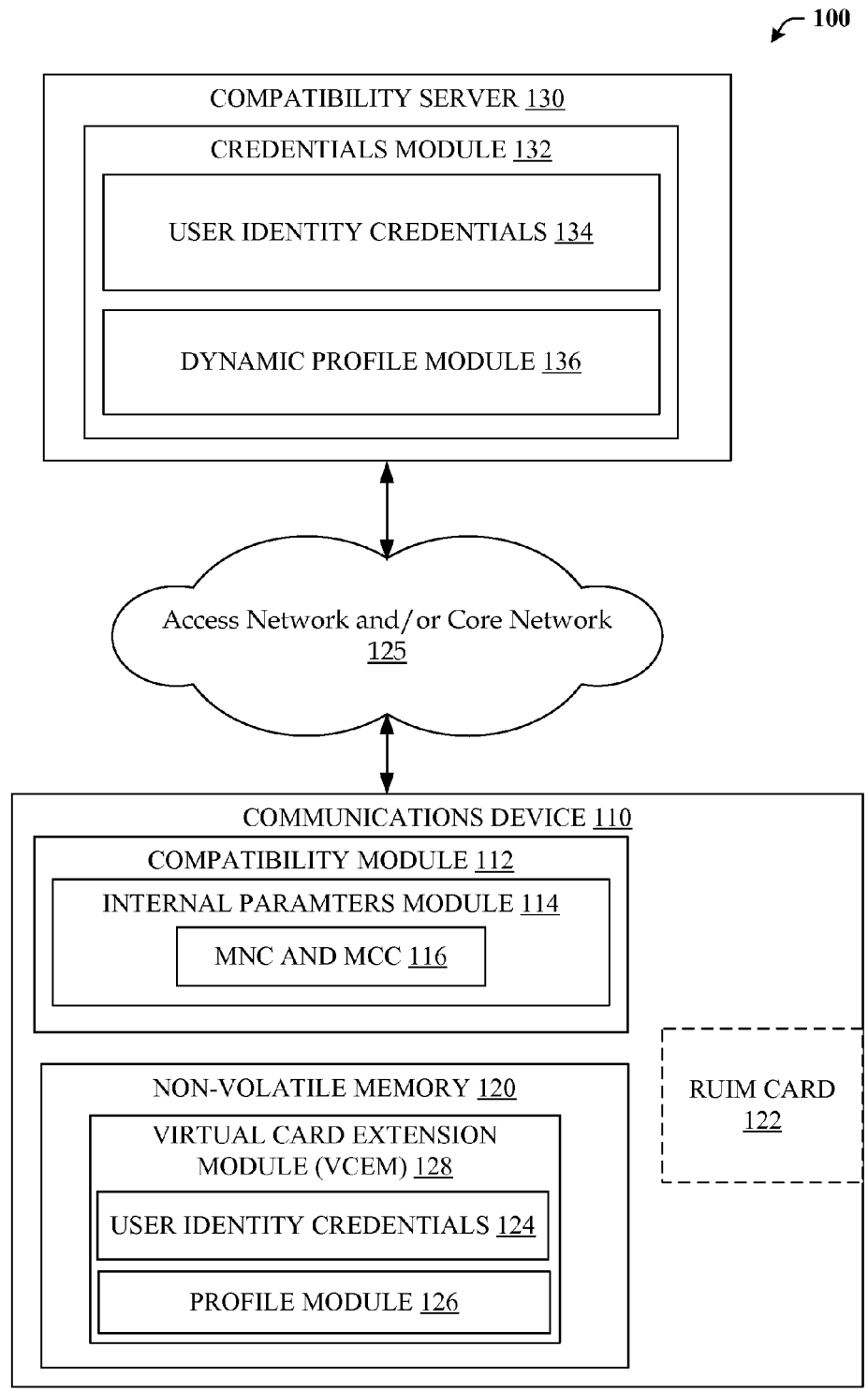
FIG. 1 illustrates a block diagram of a communication network according to an aspect.

With reference to FIG. 1, a block diagram of a communication network 100 according to an aspect is illustrated. Communication network 100 may include communications devices 110 connected to an access network and/or core network 125 (e.g., a CDMA network, a GPRS network, a UMTS network, and other types of wireline and wireless communication networks). Communication network 100 may further include a one or more of servers, such as compatibility server 130, connected to network 125.

In one aspect, communications device 110 may further include compatibility module 112, and Virtual Card Extension Module (VCEM) 128. In one aspect, the VCEM may be described as a virtual identification module. Additionally, communications device 110 may operationally include removable memory card 122, such as but not limited to, a removable user identity module (RUIM) card, a CDMA subscriber identity module (CSIM), etc. In one aspect, compatibility module 112 may include internal parameters module 114, which may include information such as, but not limited to, mobile network code (MNC), mobile country code (MCC), etc. 116. Further, VCEM 128 residing in device non-volatile (NV) memory 120 may include identity credentials 124 and profile module 126 operable to assist operability, priority allocation, etc., for applications associated with communications device 110. In one aspect, compatibility module 112 may be operable to enable features not otherwise accessible through a module and/or application associated with communications device 110.

In one aspect, a RUIM card 122 may be a legacy card which does not allow for one or more functions accessible through a more to date RUIM card 122 to be operable. For example, the RUIM card 122 may not allow access to one or more features that may be otherwise accessible a 3G packet data (3GPD) system. In such an example, instead of removing the feature to access 3GPD from the RUIM card 122, compatibility module 112 may be operable to detect the old RUIM card 122 and fallback to read from VCEM 128 for 3GPD configurations and/or user identity credentials 124. Further, in another example, if a new C.S0023 Rev D/C.S0065 Rev A or later compliant card 122 is used, compatibility module 112 may detect a kind of application first (e.g., whether the card 122 is a RUIM card type, CSIM card type, etc.). Thereafter, when the card 122 type is detected as a RUIM card, compatibility module 112 may be operable to detect whether the card 122 is update or a legacy card 122. Where the card 122 is detected to be a legacy card, user identity credentials 124 may be read from VCEM 128—to provide communications device 110 with access to additional features.

In one aspect, detecting legacy card attributes may be performed by checking whether a 3GPD extension (3GPD_EXTN) service (N15) is activated in an Elementary File-CDMA service table (EF-CST). In such an aspect, when a RUIM card is inserted, compatibility module 112 may check 3GPD simple IP (3GPD_SIP) and 3GPD mobile IP (3GPD_MIP) services in an EF-CST and may access 3GPD credentials from RUIM card. Additionally, compatibility module 112 may check 3GPD_EXTN service (N15) in EF-CST to differentiate legacy RUIM card (e.g., C.S0023-0 or C.S0023-B RUIM cards). In one aspect, compatibility module 112 may be operable to obtain missing information from profile module 126. In one aspect, a dynamic profile may be defined as a profile which includes profile information from profile module 126 to augment profile information available from the card 122. In another aspect, a static profile may be defined as a fully compatible profile stored on the card 122.

In another aspect, detecting legacy card attributes may be performed by checking an EF-revision file. In such an aspect, a EF-revision file may provide information related to different version of a RUIM card, (e.g., Rev 0 as 00000000, Rev A as 00000001, Rev B as 00000010, Rev C as 00000011, Rev D as 00000100, etc.). Where an operator's RUIM card have been configured with the same values, checking the EF-revision file may allow compatibility module 112 to differentiate old RUIM cards and new OMH RUIM cards.

In still another aspect, detecting legacy card attributes may be performed by checking for the presence of an EF-SIPUPPEXT (6F7D) EF item. In such an aspect, as the EF-SIPUPPEXT was not added until C.S0023-D standard was enacted, the presence of the EF-SIPUPPEXT element indicates the card 122 is up to date. The above described aspects related to detecting attributes of a card 122 are further discussed with respect to FIG. 3.

In one aspect, compatibility server 130 may include credentials module 132. As noted above, compatibility module 112 may access missing user credentials 124 and/or profile information from communications device 110 VCEM 128 where the information is determined to not be present in the removable memory card 122. In one aspect, where the missing user credentials 124 and/or profile information may not be available from the communications device 110 non-volatile memory 120, then communication device 110 may communicate with compatibility server 130 to obtain the missing user credentials 124 and/or profile information. In such an aspect, missing user credentials 124 and/or profile information may be accessible through credentials module 132. Further, credentials module 132 may include user identity credentials module 134 to enable access to missing user credentials, as determined by compatibility module 112. Still further, dynamic profile module 136 may include profile information to enable access to missing profile information, as determined by compatibility module 112.

As such, communications system 100 provides an environment in which communications device 110 may coordinate with compatibility server 130 to enable backward compatibility for modules and/or applications associated with communications device 110. In one aspect, the backward compatibility may be accomplished through augmenting legacy removable memory cards 122 with up-to-date information and/or profiles.

Figure 2:
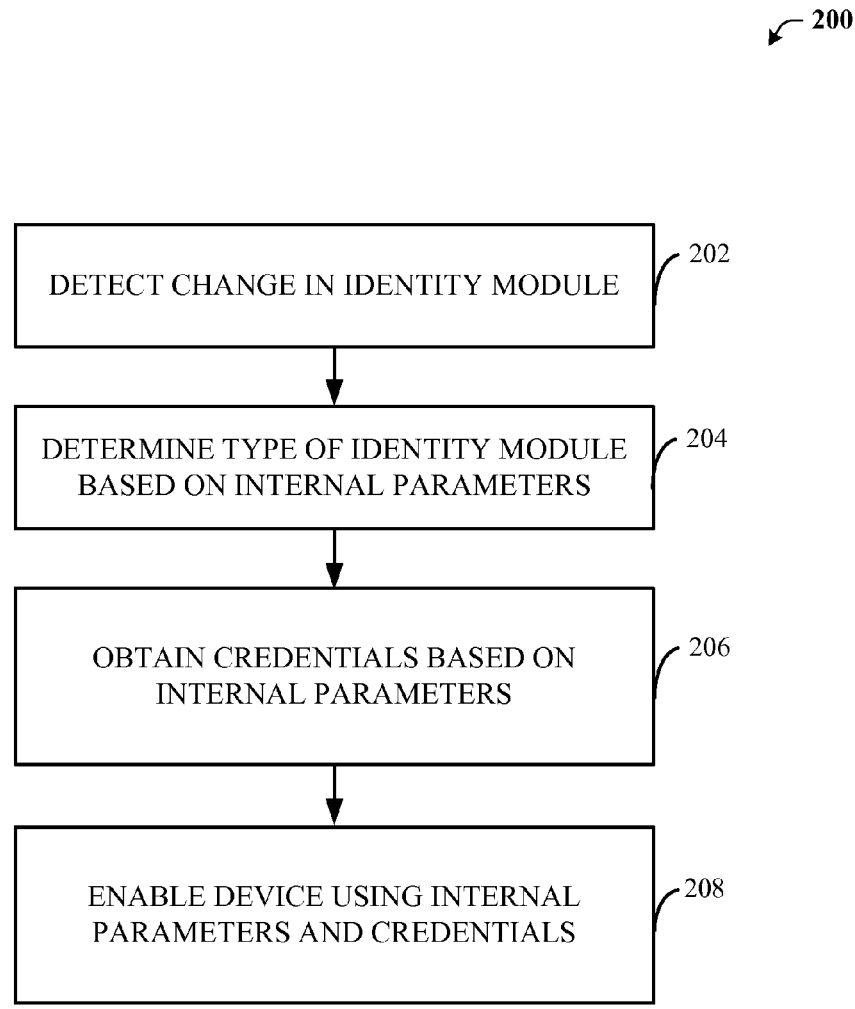
FIG. 2 illustrates a flowchart describing an example system for enabling backward compatibility in a OMH according to an aspect.
Figure 3:
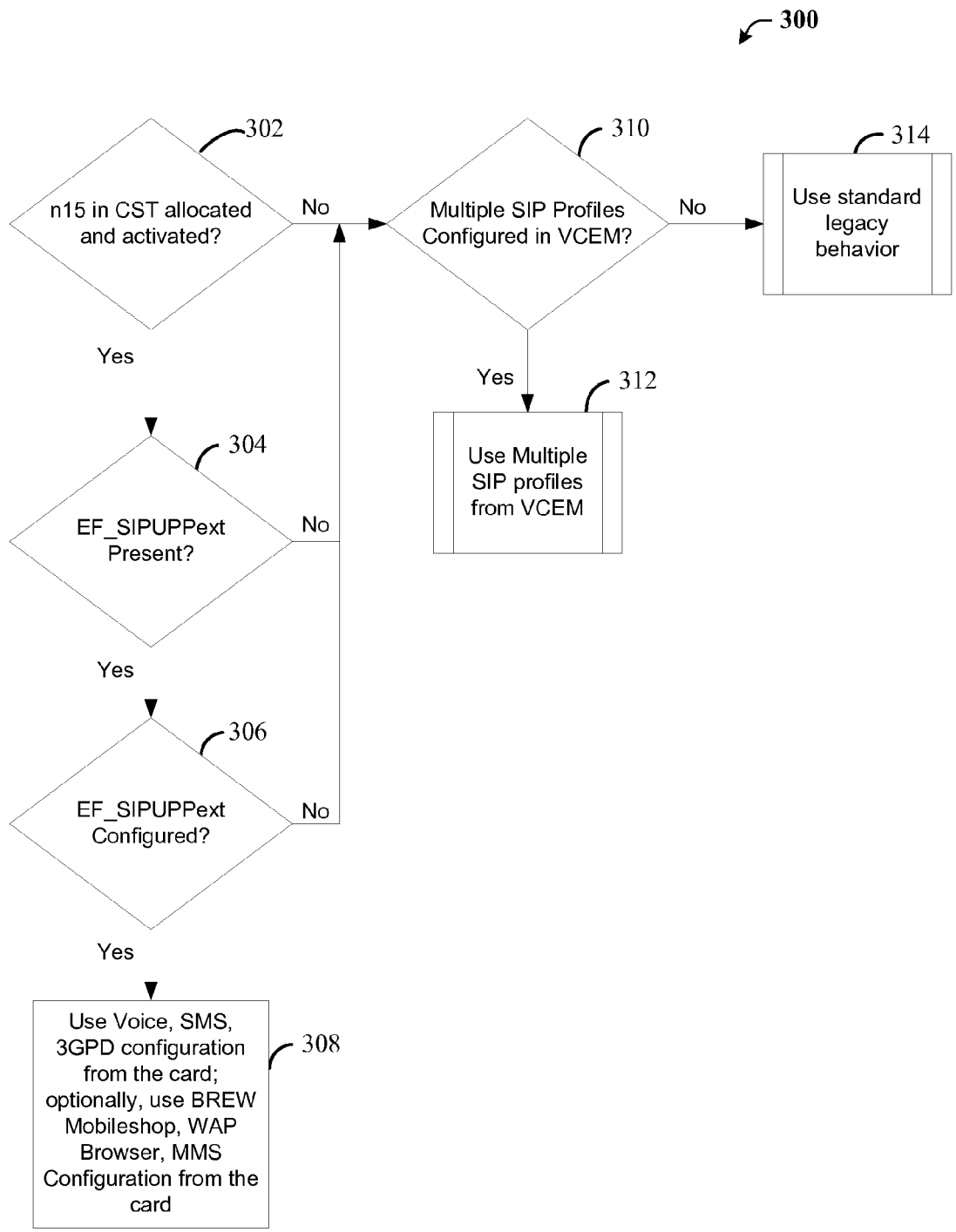
FIG. 3 illustrates a flowchart describing another example system for enabling backward compatibility in a OMH according to an aspect.
Figure 4:
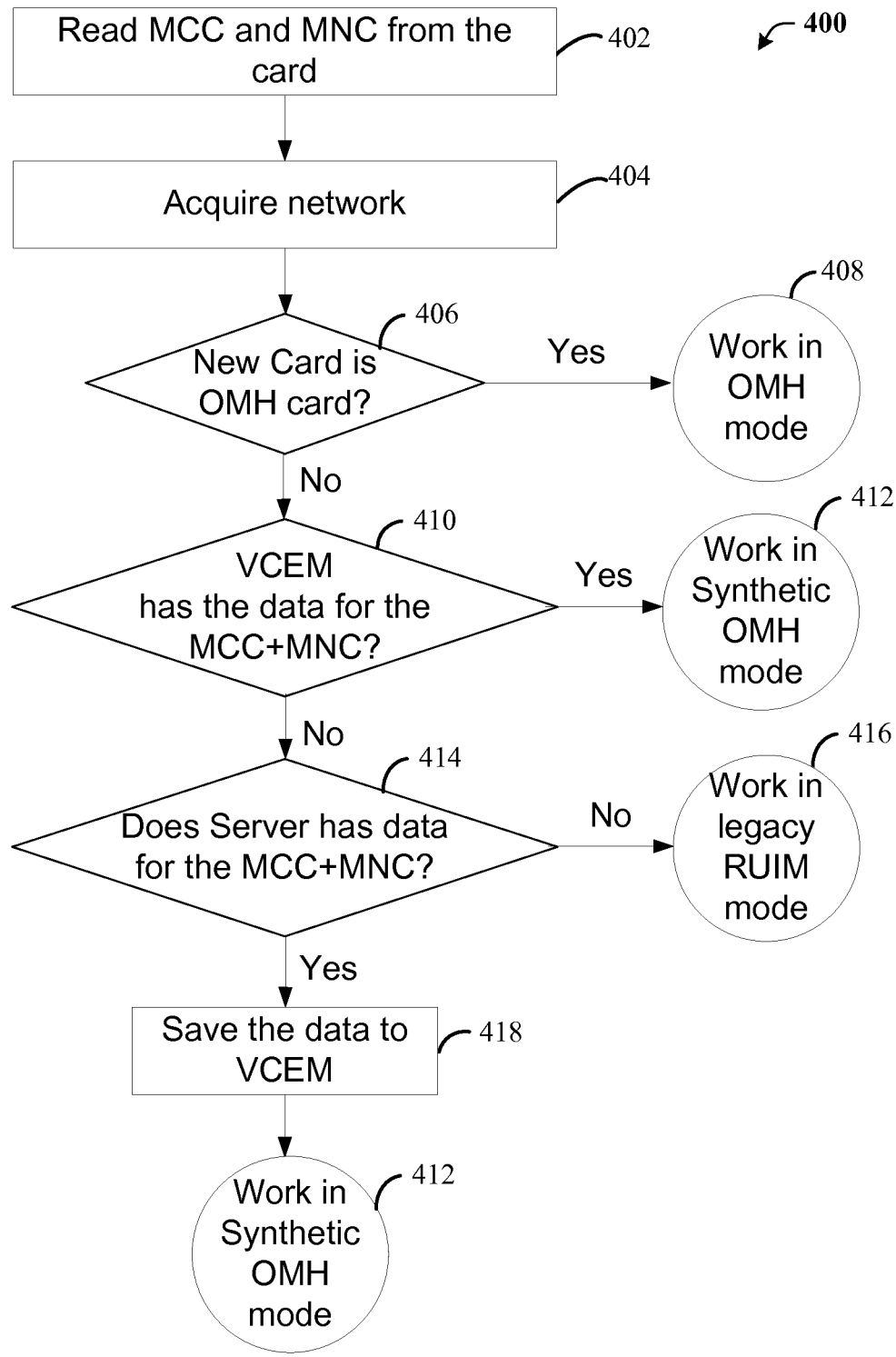
FIG. 4 illustrates a flowchart describing an example system for facilitating OMH operability according to an aspect.

FIGS. 2, 3 and 4 illustrate various methodologies in accordance with various aspects of the presented subject matter. While, for purposes of simplicity of explanation, the methodologies are shown and described as a series of acts or sequence steps, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

With reference now to FIG. 2, an example flowchart describing a system 200 for enable backward compatibility for modules and/or applications is illustrated. At reference numeral 202, a change associated with an identity module may be detected. In one aspect, the identity module may be a RUIM card, a CSIM card, etc. In one aspect, the change may include, but is not limited to: addition of the identity module, updating the identity module, replacing an existing identity module, etc. At reference numeral 204, a type of identity module may be determined based at least in part on internal parameters. In one aspect, the internal parameters may include a MNC, a MCC, an n15 element in a CST table, an EF_SIPUPPext element, etc. At reference numeral 206, additional compatibility credentials are obtained. In one aspect, the credentials may include OMH compatibility credentials, 3GPD compatibility credentials, etc. In one aspect, the credentials may be obtained from non-volatile memory associated with the device. In another aspect, the credentials may be obtained from a compatibility server. At reference numeral 208, the obtained credentials and the internal parameters may be used to enable the device. In one aspect, the obtained credentials and the internal parameters may be used to generate a virtual card extension module (VCEM) which provides functionality beyond what is available through legacy RUIM cards.

With reference now to FIG. 3, an exemplary flowchart describing a system 300 for facilitating backward compatibility for open market handsets (OMH) is illustrated. At reference numeral 302, it is determined whether a card associated with the communications device includes an n15 element in a CST list which is both allocated and activated. In one aspect, configuration information may enable services such as, but not limited to, voice, SMS web browsing MMS, etc.

If, at reference numeral 302, it is determined that an n15 element is allocated and activated, then at reference numeral 304 it is determined if an EF_SIPUPPext element is present. If at reference numeral 304, it is determined that an EF_SIPUPPext element is present, then at reference numeral 306 it is determined if the EF_SIPUPPext element is properly configured. If at reference numeral 306, it is determined that the EF_SIPUPPext element is properly configured, then at reference numeral 308 the communications device may access configuration information from the card. In one aspect, configuration information may enable services such as, but not limited to, voice, SMS web browsing MMS, etc.

By contrast, if at any one of reference numerals 302, 302, or 306 it is determined the element is faulty and/or not present, then at reference numeral 310 it is determined if a one or more profiles are stored on the mobile equipment (ME). In one aspect, the multiple profiles may be stored in VCEM which may reside in non-volatile memory. If at reference numeral 310 it is determined that one or more applicable profiles are stored in the communications device memory, then at reference numeral 312 the communications device may access the stored profiles and operate using the stored configuration information. In another aspect, the communications device may access a remote server to download the profiles (e.g., provisioning parameters, etc.) if available and operate using the downloaded configuration information. By contrast, if at reference numeral 310 it is determined that no applicable profiles are stored in the communications device memory (e.g., in the VCEM), then at reference numeral 312 the communications device may operate in a legacy mode.

Referring to FIG. 4, an exemplary flowchart describing a system 400 for facilitating open market handset (OMH) operability is illustrated. At reference numeral 402, a mobile equipment (ME) may include a memory card from which a mobile country code (MCC) and a mobile network code (MNC) may be obtained. In one aspect, the MCC and MNC may be read from the mobile International Mobile Subscriber Identity (IMSI_M) elementary file (EF present in the card).

At reference numeral 404, the communications device may acquire a network connection. In one aspect, the network may allow for connection with a compatibility server. At reference numeral 406, it is determined if the card is an OMH compatible card. In one aspect, the card may be a removable user identity module (RUIM) card. In another aspect, the card may be a CDMA subscriber identity module (CSIM) card. In one aspect, the card may be compatible with C.S0023-D (for RUIM) or C.S0065-A (for CSIM) standards. In such an aspect, new services may be indicated in EFs. In still another aspect, the card may be compatible with C.S0023-0 or C.S0023-B standards. In such an aspect, an OMH handset may not be fully operational.

If it is determined that the memory card is OMH compatible at reference numeral 406, then at reference numeral 408, the communications device may function in an OMH mode. By contrast, if it is determined that the memory card is not OMH compatible at reference numeral 406, then at reference numeral 410 it is determined that the VCEM on the communications device has information corresponding features available for an OMH mode.

If at reference numeral 410 the communications device does have the corresponding information in the VCEM, then at reference numeral 412 the communications device may be operable in a synthetic OMH mode. As used herein, a synthetic OMH mode may include a mode of operation in which a portion of OMH features are obtained from a memory card, and a different portion of features are obtained from the VCEM. By contrast, if at reference numeral 410 the communications device does not have the corresponding information in the VCEM, then at reference numeral 414 the compatibility server is checked to determine if corresponding information is available.

If at reference numeral 414 it is determined corresponding is not available from the compatibility server, then at reference numeral 416 the communications device may function using information available from the memory card. In one aspect, this operational state may be referenced to as a legacy RUIM mode. By contrast, if at reference numeral 414 it is determined that corresponding is available from the compatibility server then at reference numeral 418 the corresponding information may be downloaded and stored in the VCEM and the communications device may operate in a synthetic OMH mode.

Figure 5:
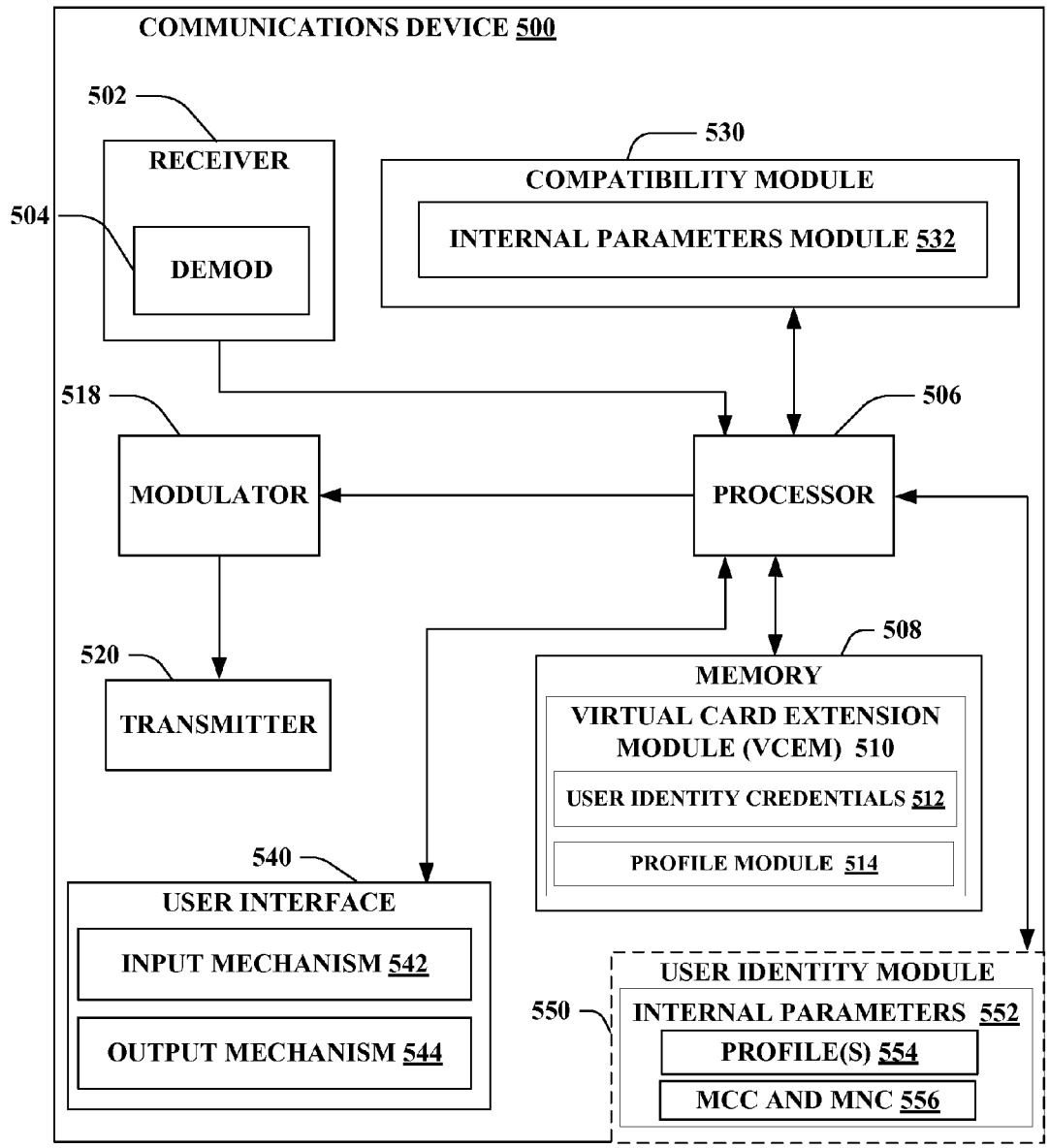
FIG. 5 illustrates a block diagram example architecture of a communications device.

While still referencing FIG. 1, but turning also now to FIG. 5, an example architecture of communications device 110 is illustrated. As depicted in FIG. 5, device 500 comprises receiver 502 that receives a signal from, for instance, a receive antenna (not shown), performs typical actions on (e.g., filters, amplifies, downconverts, etc.) the received signal, and digitizes the conditioned signal to obtain samples. Receiver 502 can comprise a demodulator 504 that can demodulate received symbols and provide them to processor 506 for channel estimation. Processor 506 can be a processor dedicated to analyzing information received by receiver 502 and/or generating information for transmission by transmitter 520, a processor that controls one or more components of device 500, and/or a processor that both analyzes information received by receiver 502, generates information for transmission by transmitter 520, and controls one or more components of device 500.

Device 500 can additionally comprise memory 508 that is operatively coupled to processor 506 and that can store data to be transmitted, received data, information related to available channels, data associated with analyzed signal and/or interference strength, information related to an assigned channel, power, rate, or the like, and any other suitable information for estimating a channel and communicating via the channel. In one aspect, memory 508 can include VCEM 510. In one aspect, VCEM 510 may be used to augment user identity credentials 512 available to the communications device 110 to provide additional functionality. In one aspect, the VCEM 510 may include profile 514 module which may augment OMH compatibility credentials, 3GPD compatibility credentials, etc.

Further, processor 506 can provide means detecting a change in the identity module, wherein the change is either adding of a new identity module to the device, or changing the type of the identity module in the device, and means for enabling the device using the one or more internal parameters and the one or more obtained credentials.

It will be appreciated that data store (e.g., memory 508) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory 508 of the subject systems and methods may comprise, without being limited to, these and any other suitable types of memory.

Device 500 can further include compatibility module 530 to facilitate backward compatibility with various legacy user identity modules 550 by device 500. In one aspect, compatibility module 530 may include internal parameters module 532, which may include information such as, but not limited to, mobile network code (MNC), mobile country code (MCC), etc. Further, internal parameters module 532 may be operable to assist operability, priority allocation, etc., for applications associated with communications device 500. In one aspect, compatibility module 530 may be operable to enable features not otherwise accessible through user identity modules 550 and/or applications associated with communications device 500.

Additionally, communications device 500 may include user interface 540. User interface 540 may include input mechanisms 542 for generating inputs into communications device 500, and output mechanism 542 for generating information for consumption by the user of the communications device 500. For example, input mechanism 542 may include a mechanism such as a key or keyboard, a mouse, a touchscreen display, a microphone, etc. Further, for example, output mechanism 544 may include a display, an audio speaker, a haptic feedback mechanism, a Personal Area Network (PAN) transceiver etc. In the illustrated aspects, the output mechanism 544 may include a display operable to present media content that is in image or video format or an audio speaker to present media content that is in an audio format.

Further, in one optionally aspect, communications device 500 may include user identity module 550. In one aspect, user identity module may include internal parameters 552, such as but not limited to, one or more profiles 554, MNC and MCC values 556, etc. In one aspect, the internal parameters 552 may further include an n15 element in a CST table, an EF_SIPUPPext element, etc.

It will be appreciated that user identity module 550 described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). In another aspect, user identity module 550 described herein can be removable memory card, such as but not limited to, a removable user identity module (RUIM) card, a CDMA subscriber identity module (CSIM), etc.

Figure 6:
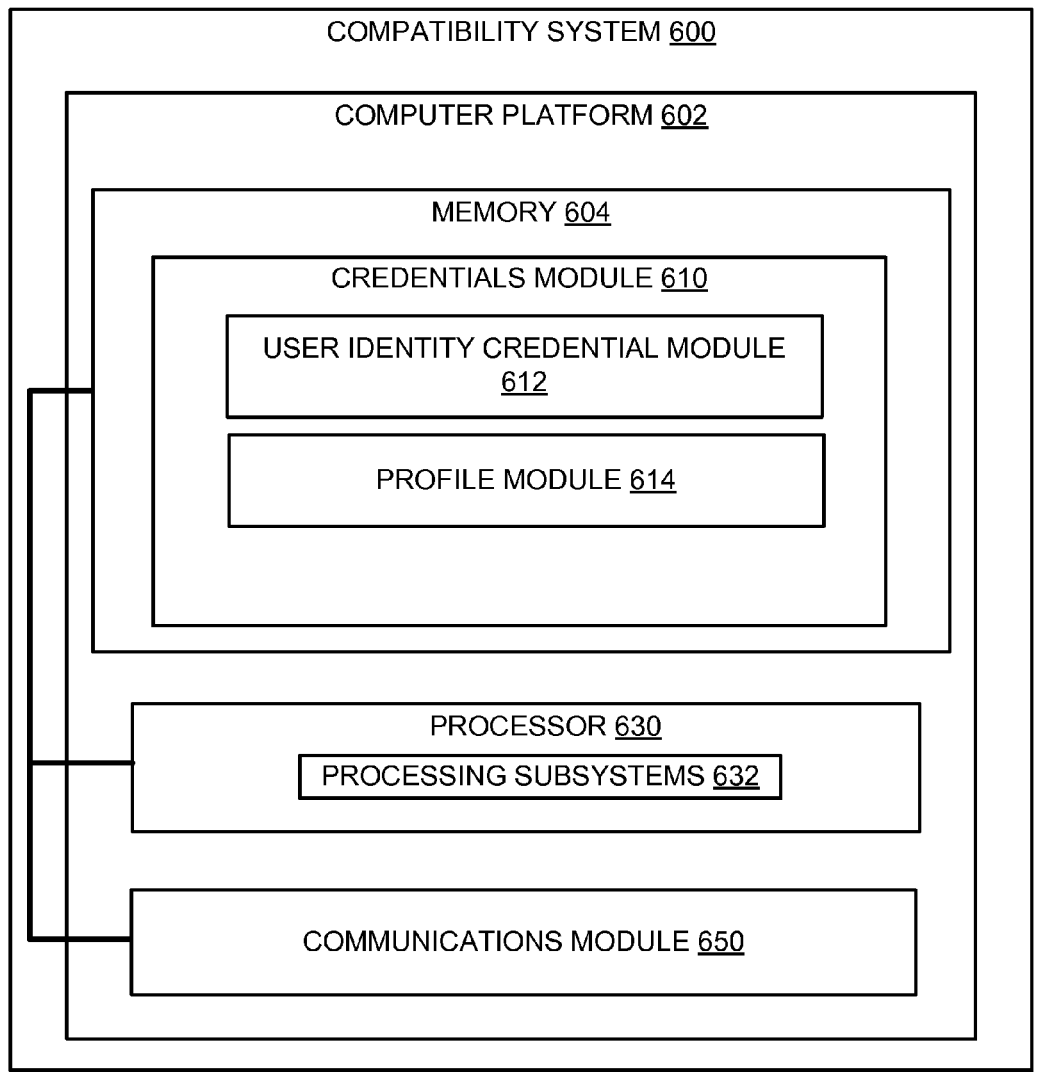
FIG. 6 illustrates example block diagram of a compatibility system according to an aspect.

With reference to FIG. 6, illustrated is a detailed block diagram of compatibility system 600, such as compatibility server 130 depicted in FIG. 1. Compatibility system 600 may comprise at least one of any type of hardware, server, personal computer, mini computer, mainframe computer, or any computing device either special purpose or general computing device. Further, the modules and applications described herein as being operated on or executed by Compatibility system 600 may be executed entirely on a single network device, as shown in FIG. 6, or alternatively, in other aspects, separate servers, databases or computer devices may work in concert to provide data in usable formats to parties, and/or to provide a separate layer of control in the data flow between devices, such as communications device 110, and the modules and applications executed by Compatibility system 600.

Compatibility system 600 includes computer platform 602 that can transmit and receive data across wired and wireless networks, and that can execute routines and applications. Computer platform 602 includes memory 604, which may comprise volatile and nonvolatile memory such as read-only and/or random-access memory (ROM and RAM), EPROM, EEPROM, flash cards, or any memory common to computer platforms. Further, memory 604 may include one or more flash memory cells, or may be any secondary or tertiary storage device, such as magnetic media, optical media, tape, or soft or hard disk. Further, computer platform 602 also includes processor 630, which may be an application-specific integrated circuit ("ASIC"), or other chipset, logic circuit, or other data processing device. Processor 630 may include various processing subsystems 632 embodied in hardware, firmware, software, and combinations thereof, that enable the functionality of compatibility system 600 and the operability of the network device on a wired or wireless network.

Computer platform 602 further includes communications module 650 embodied in hardware, firmware, software, and combinations thereof, that enables communications among the various components of compatibility system 600, as well as between compatibility system 600 and communications device 110. Communication module 650 may include the requisite hardware, firmware, software and/or combinations thereof for establishing a wireless communication connection. According to described aspects, communication module 650 may include the necessary hardware, firmware and/or software to facilitate wireless and/or wireline communication between compatibility server 130 and device 110.

Memory 604 of Compatibility system 600 includes a credentials module 610 which may be operable to provide a device, such as communications device 110, with additional user identity credentials, profile information, etc. to facilitate backward compatibility for the communications device 110. In one aspect, credentials module 604 may include user identity credentials module 612 to enable access to missing user credentials. Still further, profile module 614 may include profile information to enable access to missing profile information. In one aspect, the credentials may include OMH compatibility credentials, 3GPD compatibility credentials, etc.

Figure 7:
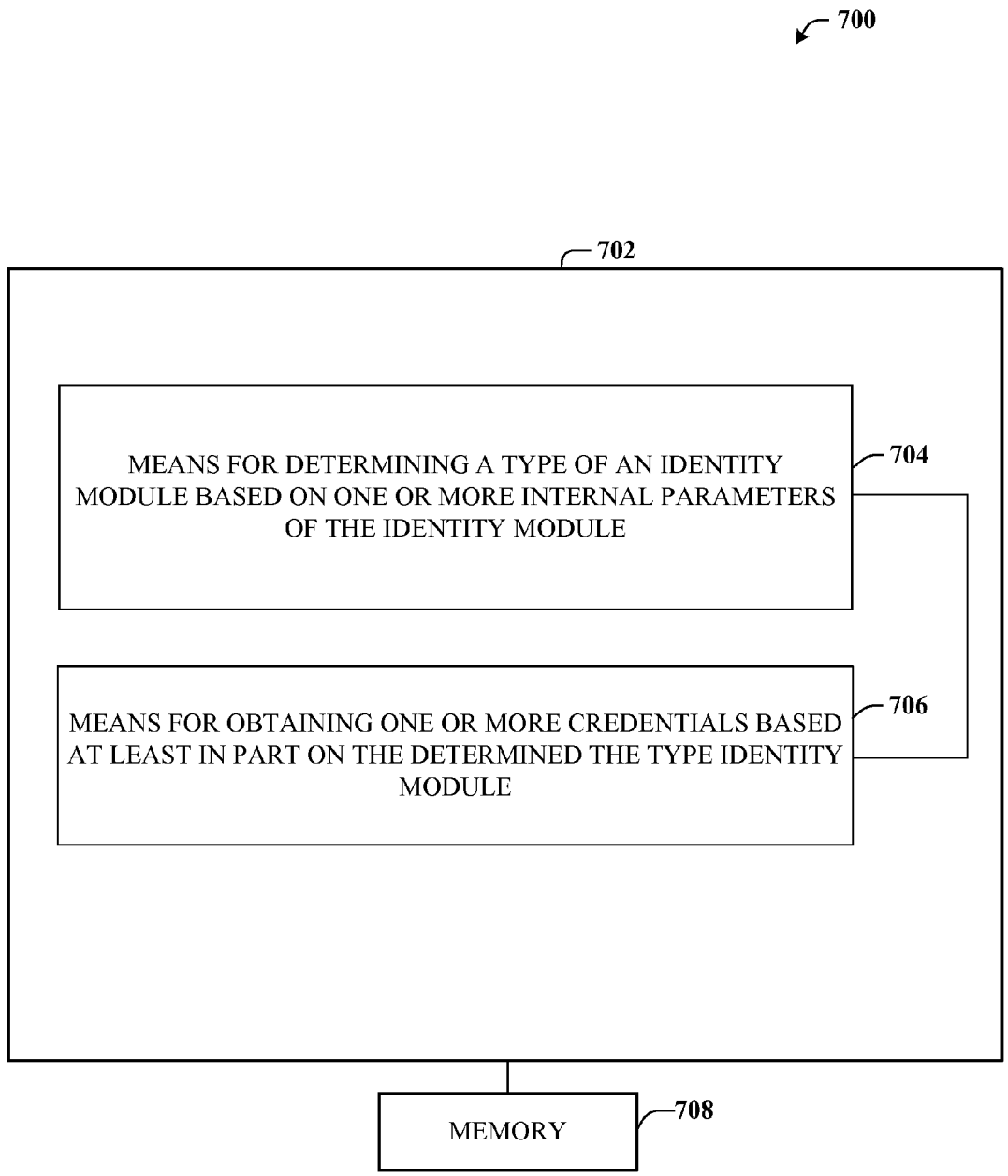
FIG. 7 illustrates a block diagram of an example communication system that can enable OMH backward compatibility, according to another aspect.

With reference to FIG. 7, illustrated is a system 700 for enabling backward compatibility in OMHs, according to one aspect. For example, system 700 can reside at least partially within a communications device, user equipment, etc. It is to be appreciated that system 700 is represented as including functional blocks, which can be functional blocks that represent functions implemented by a processor, software, or combination thereof (e.g., firmware).

System 700 includes a logical grouping 702 of means that can act in conjunction. For instance, logical grouping 702 can include means for determining a type of an identity module based on one or more internal parameters of the identity module 704. In one aspect, the one or more internal parameters may include a state of a service parameter, a configuration parameter, etc. In another aspect, the one or more internal parameters may include an n15 element in a CST table, or an EF_SIPUPPext element. In such an aspect, the means for determining may further include means for determining that the EF_SIPUPPext element is faulty when at least one of: the EF_SIPUPPext element is not present, or the EF_SIPUPPext element is not properly configured. In another aspect, the identity module can include a mobile country code (MCC) and a mobile network code (MNC). In another aspect, the identity module may include either a RUIM or a CSIM, where a legacy identity module may be defined as a RUIM not compatible with a C.S0023-D standard, or a CSIM not compatible with a C.S0065-A standard. In one aspect, the one or more credentials may include: open market handset (OMH) credentials, 3G packet data (3GPD) credentials, etc. In another aspect, the means for obtaining may include means for using the MCC and MNC to determine the one or more credentials. In another aspect, the means for obtaining may further include means for determining the one or more credentials are stored in nonvolatile (NV) memory of the device, and means for accessing the one or more credentials stored in the NV memory of the device. In another aspect, the means for obtaining may further include means for determining the one or more credentials are available from a server, and means for accessing the one or more credentials from the server. In another aspect, the means for obtaining may further include means for obtaining a dynamic profile for an application based on the one or more internal parameters of the identity module, where the dynamic profile includes one or more parameters different than the one or more internal parameters. Still further, logical grouping 702 can include means for detecting a change in the identity module, wherein the change is either adding of a new identity module to the device, or changing the type of the identity module in the device, and enabling the device using the one or more internal parameters and the one or more obtained credentials. Further, logical grouping 702 can include means for generating a virtual card extension module based on the one or more internal parameters of the identity module and the obtained one or more credentials. Further, logical grouping 702 can include means for detecting that the identity module has been connected to the device, and determining that the type of the identity module is a legacy identity module.

Additionally, system 700 can include a memory 708 that retains instructions for executing functions associated with the means 704 and 706. While shown as being external to memory 708, it is to be understood that one or more of the means 704 and 706 can exist within memory 708.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal A terminal can also be called a system, device, subscriber unit, subscriber station, mobile station, mobile, mobile device, remote station, mobile equipment (ME), remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" GPP2). Further, such wireless communication systems may additionally include peer-to-peer (e.g., mobile-to-mobile) ad hoc network systems often using unpaired unlicensed spectrums, 602.xx wireless LAN, BLUETOOTH and any other short- or long-range, wireless communication techniques.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An example storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or aspects, it should be noted that various changes and modifications could be made herein without departing from the scope of the described aspects and/or aspects as defined by the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

What is claimed is:

1. A method of communications for a device, comprising:
   determining a type of an identity module based on one or more internal parameters of the identity module;
   obtaining one or more missing user credentials based at least in part on the determined type of the identity module, wherein the one or more missing user credentials are not available through the identity module; and
   generating a virtual identification module based on the one or more internal parameters of the identity module and the obtained one or more missing user credentials,
   wherein the identity module comprises a mobile country code (MCC) and a mobile network code (MNC), and wherein the obtaining further comprises using the MCC and MNC to determine the one or more missing user credentials.

2. The method of claim 1, further comprising:
   detecting a change in the identity module, wherein the change is either adding of a new identity module to the device, or changing the type of the identity module in the device; and
   enabling the device using the one or more internal parameters and the one or more obtained missing user credentials.

3. The method of claim 1, wherein the one or more internal parameters comprise at least one of: a state of a service, or a configuration parameter.

4. The method of claim 1, wherein the one or more missing user credentials comprise at least one of: open market handset (OMH) credentials, or 3G packet data (3GPD) credentials.

5. The method of claim 1, wherein the obtaining further comprises:
   determining the one or more missing user credentials are stored in nonvolatile (NV) memory of the device; and
   accessing the one or more missing user credentials stored in the NV memory of the device.

6. The method of claim 1, wherein the obtaining further comprises:
   determining at least one of: one or more provisioning parameters or the one or more missing user credentials are available from a server; and
   accessing the at least one of the one or more provisioning parameters or the missing user one or more credentials from the server.

7. The method of claim 1, wherein the obtaining further comprises:
   obtaining a dynamic profile for an application based on the one or more internal parameters of the identity module, wherein the dynamic profile includes one or more parameters different than the one or more internal parameters.

8. The method of claim 1, wherein the virtual identification module resides in a non-volatile memory of the device.

9. The method of claim 1, further comprising:
   detecting that the identity module has been connected to the device; and
   determining that the type of the identity module is a legacy identity module.

10. The method of claim 9, wherein the identity module comprises either a removable user identify module (RUIM) or a CDMA subscriber identity module (CSIM), wherein a legacy identity module comprises a RUIM not compatible with a C.S0023-D standard, or a CSIM not compatible with a C.S0065-A standard.

11. The method of claim 1, wherein the one or more internal parameters comprise at least one of:
    an n15 element in a CST table of RUIM;
    n35 element in a CST table of CSIM; or
    an EF_SIPUPPext element.

12. The method of claim 11, further comprising:
    determining that the EF_SIPUPPext element is faulty when at least one of:
    the EF_SIPUPPext element is not present; or
    the EF_SIPUPPext element is not properly configured.

13. At least one processor configured to provide backward compatibility, comprising:
    a first module configured to determine a type of an identity module based on one or more internal parameters of the identity module; and
    a second module configured to obtain one or more missing user credentials based at least in part on the determined type of the identity module, wherein the one or more missing user credentials are not available through the identity module; and
    a third module configured to generate a virtual identification module based on the one or more internal parameters of the identity module and the obtained one or more missing user credentials,
    wherein the identity module comprises a mobile country code (MCC) and a mobile network code (MNC), and wherein the obtaining further comprises using the MCC and MNC to determine the one or more missing user credentials.

14. A computer program product, comprising:
    a non-transitory computer-readable medium comprising:
    a first set of codes that causes a computer to determine a type of an identity module based on one or more internal parameters of the identity module;
    a second set of codes that causes the computer to obtain one or more missing user credentials based at least in part on the determined type of the identity module, wherein the one or more missing user credentials are not available through the identity module; and
    a third set of codes that causes the computer to generate a virtual identification module based on the one or more internal parameters of the identity module and the obtained one or more missing user credentials,
    wherein the identity module comprises a mobile country code (MCC) and a mobile network code (MNC), and wherein the obtaining further comprises using the MCC and MNC to determine the one or more missing user credentials.

15. An apparatus, comprising:
    means for determining a type of an identity module based on one or more internal parameters of the identity module;
    means for obtaining one or more missing user credentials based at least in part on the determined type of the identity module, wherein the one or more missing user credentials are not available through the identity module; and
    means for generating a virtual identification module based on the one or more internal parameters of the identity module and the obtained one or more missing user credentials, wherein the identity module comprises a mobile country code (MCC) and a mobile network code (MNC), and wherein the obtaining further comprises using the MCC and MNC to determine the one or more missing user credentials.

16. The apparatus of claim 15, further comprising:
means for detecting a change in the identity module, wherein the change is either adding of a new identity module to the device, or changing the type of the identity module in the device; and
means for enabling the device using the one or more internal parameters and the one or more obtained missing user credentials.

17. The apparatus of claim 15, wherein the one or more internal parameters comprise at least one of: a state of a service, or a configuration parameter.

18. The apparatus of claim 15, wherein the one or more missing user credentials comprise at least one of: OMH credentials, or 3G packet data (3GPD) credentials.

19. The apparatus of claim 15, wherein the means for obtaining further comprise:
means for determining the one or more missing user credentials are stored in nonvolatile (NV) memory of the device; and
means for accessing the one or more missing user credentials stored in the NV memory of the device.

20. The apparatus of claim 15, wherein the means for obtaining further comprise:
means for determining at least one of: one or more provisioning parameters or the one or more missing user credentials are available from a server; and
means for accessing the at least one of the one or more provisioning parameters or the one or more missing user credentials from the server.

21. The apparatus of claim 15, wherein the means for obtaining further comprise:
means for obtaining a dynamic profile for an application based on the one or more internal parameters of the identity module, wherein the dynamic profile includes one or more parameters different than the one or more internal parameters.

22. The apparatus of claim 15, further comprising:
a non-volatile memory wherein the virtual identification module resides in the non-volatile memory.

23. The method of claim 15, further comprising:
means for detecting that the identity module has been connected to the device; and
means for determining that the type of the identity module is a legacy identity module.

24. The apparatus of claim 23, wherein the identity module comprises either a removable user identify module (RUIM) or a CDMA subscriber identity module (CSIM), wherein a legacy identity module comprises a RUIM not compatible with a C.S0023-D standard, or a CSIM not compatible with a C.S0065-A standard.

25. The apparatus of claim 15, wherein the one or more internal parameters comprise at least one of:
an n15 element in a CST table of RUIM;
n35 element in a CST table of CSIM; or
an EF_SIPUPPext element.

26. The apparatus of claim 25, further comprising:
means for determining that the EF_SIPUPPext element is faulty when at least one of:
the EF_SIPUPPext element is not present; or
the EF_SIPUPPext element is not properly configured.

27. An apparatus for enabling backward compatibility, comprising:
a compatibility module configured to:
determine a type of an identity module based on one or more internal parameters of the identity module;
obtain one or more missing user credentials based at least in part on the determined the type of the identity module, wherein the one or more missing user credentials are not available through the identity module; and
generate a virtual identification module based on the one or more internal parameters of the identity module and the obtained one or more missing user credentials,
wherein the identity module comprises a mobile country code (MCC) and a mobile network code (MNC), and wherein the obtaining further comprises using the MCC and MNC to determine the one or more missing user credentials.

28. The apparatus of claim 27, wherein the compatibility module is further configured to:
detect a change in the identity module, wherein the change is either adding of a new identity module to the device, or changing the type of the identity module in the device; and
enable the device using the one or more internal parameters and the one or more obtained missing user credentials.

29. The apparatus of claim 27, wherein the one or more internal parameters comprise at least one of: a state of a service, or a configuration parameter.

30. The apparatus of claim 27, wherein the one or more missing user credentials comprise at least one of: OMH credentials, or 3G packet data (3GPD) credentials.

31. The apparatus of claim 27, wherein the compatibility module is further configured to:
determine the one or more missing user credentials are stored in nonvolatile (NV) memory of the device; and
access the one or more missing user credentials stored in the NV memory of the device.

32. The apparatus of claim 27, wherein the compatibility module is further configured to:
determine at least one of the one or more provisioning parameters or the one or more missing user credentials are available from a server; and
access the at least one of the one or more provisioning parameters or the one or more missing user credentials from the server.

33. The apparatus of claim 27, wherein the compatibility module is further configured to:
obtain a dynamic profile for an application based on the one or more internal parameters of the identity module, wherein the dynamic profile includes one or more parameters different than the one or more internal parameters.

34. The apparatus of claim 27, wherein the virtual identification module resides in a non-volatile memory of the device.

35. The apparatus of claim 27, wherein the compatibility module is further configured to:
detect that the identity module has been connected to the device; and
determine that the type of the identity module is a legacy identity module.

36. The apparatus of claim 35, wherein the identity module comprises either a removable user identify module (RUIM) or a CDMA subscriber identity module (CSIM), and wherein a legacy identity module comprises a RUIM not compatible with a C.S0023-D standard, or a CSIM not compatible with a C.S0065-A standard.

37. The apparatus of claim 27, wherein the one or more internal parameters comprise at least one of:
an n15 element in a CST table of RUIM;
n35 element in a CST table of CSIM; or
an EF_SIPUPPext element.

38. The apparatus of claim 37, wherein the compatibility module is further configured to:
   determine that the EF_SIPUPPext element is faulty when at least one of:
   the EF_SIPUPPext element is not present; or
   the EF_SIPUPPext element is not properly configured.

\* \* \* \* \*